(12) United States Patent
Yan et al.

(10) Patent No.: US 10,585,306 B2
(45) Date of Patent: Mar. 10, 2020

(54) LIQUID CRYSTAL PANEL, LIQUID CRYSTAL DISPLAY, AND METHOD FOR MANUFACTURING A YELLOW-DYE POLARIZER

(71) Applicant: Shenzhen China Star Optoelectronics Technology Co., Ltd., Shenzhen, Guangdong (CN)

(72) Inventors: Chunqiu Yan, Guangdong (CN); Zhenxia Chen, Guangdong (CN); Lixuan Chen, Guangdong (CN); Hsiao Hsien Chen, Guangdong (CN); Yung-Jui Lee, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 15/570,237

(22) PCT Filed: Jul. 26, 2017

(86) PCT No.: PCT/CN2017/094553
§ 371 (c)(1),
(2) Date: Oct. 27, 2017

(87) PCT Pub. No.: WO2019/006795
PCT Pub. Date: Jan. 10, 2019

(65) Prior Publication Data
US 2019/0011775 A1   Jan. 10, 2019

(30) Foreign Application Priority Data
Jul. 6, 2017   (CN) .......................... 2017 1 0548132

(51) Int. Cl.
*G02F 1/1335*   (2006.01)

(52) U.S. Cl.
CPC .. *G02F 1/133533* (2013.01); *G02F 1/133514* (2013.01); *G02F 1/133621* (2013.01);
(Continued)

(58) Field of Classification Search
CPC ......... G02F 1/133533; G02F 1/133617; G02F 1/133514; G02F 1/133621;
(Continued)

(56) References Cited

U.S. PATENT DOCUMENTS

| 4,230,768 A * | 10/1980 | Hamada | .................. B32B 27/08 |
| | | | 428/352 |
| 2001/0000436 A1* | 4/2001 | Nose | ................. G02F 1/133603 |
| | | | 349/65 |

(Continued)

FOREIGN PATENT DOCUMENTS

| CN | 103649793 A | 3/2014 |
| CN | 104597654 A | 5/2015 |

(Continued)

OTHER PUBLICATIONS

Luobin(author), Research and development of liquid crystal light alignment[J], published at Jan. 15, 2016, Shandong Industrial Technology, No.2(2016):29.

(Continued)

*Primary Examiner* — Shan Liu
(74) *Attorney, Agent, or Firm* — Andrew C. Cheng

(57) ABSTRACT

An LC panel stacked with a blue backlight module is disclosed. The LC panel includes first and second yellow-dye polarizers, and further includes a first substrate, an LC layer, and a second substrate which are sequentially stacked-up. The first yellow-dye polarizer is sandwiched between the LC layer and the first substrate. The second yellow-dye polarizer is sandwiched between the second substrate and the LC layer, or is disposed on the surface of the second (Continued)

substrate where is far from the LC layer. The polarization direction of the first yellow-dye polarizer is perpendicular to the polarization direction of the second yellow-dye polarizer. The blue backlight module provides a blue backlight source irradiating through the displaying image of the LC panel. An LCD and a method for manufacturing a yellow-dye polarizer are disclosed. The utilization efficiency of the blue backlight source is maximized, and the degree of polarization thereof is drastically increased.

4 Claims, 3 Drawing Sheets

(52) U.S. Cl.
CPC ............ *G02F 2001/133531* (2013.01); *G02F 2001/133614* (2013.01); *G02F 2202/043* (2013.01); *G02F 2202/36* (2013.01)

(58) Field of Classification Search
CPC ........ G02F 2001/133531; G02F 2001/133614; G02F 2202/043; G02F 2202/36; G02F 1/0311; G02F 1/116; G02F 1/1335; G02F 1/133528; G02F 1/133536; G02F 1/13362; G02F 2001/133521; G02F 2001/13356; G02F 2001/133538; G02F 2001/133541; G02F 2001/133543; G02F 2001/133545; G02F 2001/133548; G02F 2001/133555; G02F 2001/133562; G02F 2001/133567; G02F 2203/16; G02B 5/3016; G02B 5/3033; G02B 6/0056; G02B 6/02109; B29D 11/00644; B32B 17/10458; B32B 2307/42; H01L 51/5293; H01R 12/7005; H04B 10/532; G01J 5/0825; G03F 9/7065; G01R 33/3678; C09K 19/0208

USPC .............................. 349/96–103, 194
See application file for complete search history.

(56) References Cited

U.S. PATENT DOCUMENTS

| | | | |
|---|---|---|---|
| 2001/0005748 A1 | 6/2001 | Kayane | |
| 2011/0155306 A1* | 6/2011 | Shimizu | G02B 5/3083 156/229 |
| 2014/0204319 A1* | 7/2014 | Cai | G02F 1/133514 349/106 |
| 2015/0331278 A1* | 11/2015 | Araki | G02F 1/133617 349/61 |
| 2016/0077385 A1* | 3/2016 | Cao | G02F 1/133512 349/96 |
| 2016/0161799 A1* | 6/2016 | Morishima | G02F 1/133514 349/71 |
| 2018/0059300 A1* | 3/2018 | Kim | G02B 1/14 |
| 2018/0100956 A1* | 4/2018 | Lee | G02B 5/201 |

FOREIGN PATENT DOCUMENTS

| | | |
|---|---|---|
| CN | 104793281 A | 7/2015 |
| CN | 105452946 A | 3/2016 |
| CN | 106019448 A | 10/2016 |
| CN | 106154390 A | 11/2016 |
| CN | 106324893 A | 1/2017 |

OTHER PUBLICATIONS

Xu Dongmei(author), Synthesis and performance studies of 1, 8-phthalimide disperse dye [J],published at Jun. 29 of 1992,Dye Industry,vol. 29, No.3,16-19.
Wang Dong,Liu Hongying,He Junhui,Liu Linlin(author), Progress in preparation of functional films by spin-coating{J], published at Mar. 15, 2012,Photographic Science and Photochemistry,vol. 30, No. 2,91-101.
CN2017105481321 1st Office Action.

* cited by examiner

LIQUID CRYSTAL PANEL, LIQUID CRYSTAL DISPLAY, AND METHOD FOR MANUFACTURING A YELLOW-DYE POLARIZER

CROSS-REFERENCE

The present application claims the priority of Chinese Patent Application No. 201710548132.1, entitled "liquid crystal panel, liquid crystal display, and method for manufacturing a yellow-dye polarizer", filed on Jul. 6, 2017, the disclosure of which is incorporated herein by reference in its entirety.

BACKGROUND OF THE INVENTION

1. Field of the Invention

The present disclosure relates to a field of display technology, and more specifically to a liquid crystal (LC) panel, a liquid crystal display (LCD), and a method for manufacturing a yellow-dye polarizer.

2. Description of the Prior Art

Liquid crystal displays often depend on a backlight source provided by a backlight module to display a text or other images. Recently, with requirements for low-cost and low-power products, liquid crystal display devices containing a blue light emitting diode (LED) have increasingly become a promising technology trend. The blue LED is used to directly emit a blue light, and corresponding blue pixels in a color filter can be designed as blank areas. That can not only save one-third of photoresist materials, but also enhance the utilization efficiency of a back light to 100%. Further, the polarizer of a liquid crystal panel is important factors which affect the display quality of a liquid crystal display. For a blue LED liquid crystal display, the studies of the polarizer matched with the blue LED liquid crystal display are not mature.

Polarizers are mainly based on an iodine contained polarizer in the prior art. A combination between a liquid crystal display containing a blue LED backlight source and the iodine contained polarizer has the disadvantages of the relatively narrow wavelength region of a blue light, the poor effect of matching with an existing iodine contained polarizer, the low utilization efficiency of a backlight source, and the high costs of the display.

SUMMARY OF THE INVENTION

A technical problem solved by the present disclosure is that a liquid crystal panel, a liquid crystal display, and a method for manufacturing a yellow-dye polarizer are provided. That are used to solve the problems of the relatively narrow wavelength region of a blue light, the poor effect of matching with an existing iodine contained polarizer, the low utilization efficiency of a backlight source, and the high costs of a display in the prior art.

A liquid crystal panel is provided. The liquid crystal panel is oppositely stacked with a blue backlight module. The liquid crystal panel includes a first yellow-dye polarizer, a second yellow-dye polarizer, a first substrate, a liquid crystal layer, and a second substrate. The first substrate, the liquid crystal layer, and the second substrate are stacked-up in sequence. The first yellow-dye polarizer is sandwiched between the liquid crystal layer and the first substrate. The second yellow-dye polarizer is sandwiched between the second substrate and the liquid crystal layer, or is disposed on the surface of the second substrate where is far from the liquid crystal layer. The polarization direction of the first yellow-dye polarizer is perpendicular to the polarization direction of the second yellow-dye polarizer. The blue backlight module provides a blue backlight source irradiating through the displaying image of the liquid crystal panel.

The first yellow-dye polarizer and the second yellow-dye polarizer include a dichroism yellow-dye compound. The dichroism yellow-dye compound includes one or more of an azo compound, an anthraquinone compound, and a naphthalimide compound.

The first yellow-dye polarizer and the second yellow-dye polarizer further include a polymerizable liquid crystal monomer, a photoinitiator, and a photo-stabilizer.

The first substrate includes a plurality of color resist blocks which are arranged in an array. The color resist blocks include a red resist block and a green resist block. The blue backlight source irradiates through the red resist block to form a red light. The blue backlight source irradiates through the green resist block to form a green light.

The first substrate includes a plurality of quantum-dot units which are arranged in an array. The quantum-dot units include a red quantum-dot unit and a green quantum-dot unit. The blue backlight source irradiates through the red quantum-dot unit to form a red light. The blue backlight source irradiates through the green quantum-dot unit to form a green light.

The blue backlight module is located on the surface of the first substrate where is far from the second substrate.

A liquid crystal display is provided. The liquid crystal display includes a blue backlight module and a liquid crystal panel. The liquid crystal panel includes a first yellow-dye polarizer, a second yellow-dye polarizer, a first substrate, a liquid crystal layer, and a second substrate. The first substrate, the liquid crystal layer, and the second substrate are stacked-up in sequence. The first yellow-dye polarizer is sandwiched between the liquid crystal layer and the first substrate. The second yellow-dye polarizer is sandwiched between the second substrate and the liquid crystal layer, or is disposed on the surface of the second substrate where is far from the liquid crystal layer. The polarization direction of the first yellow-dye polarizer is perpendicular to the polarization direction of the second yellow-dye polarizer. The blue backlight module provides a blue backlight source irradiating through the displaying image of the liquid crystal panel. The blue backlight module is oppositely stacked with the liquid crystal panel. The blue backlight module provides the blue backlight source irradiating through the displaying image of the liquid crystal panel.

The first yellow-dye polarizer and the second yellow-dye polarizer include a dichroism yellow-dye compound. The dichroism yellow-dye compound includes one or more of an azo compound, an anthraquinone compound, and a naphthalimide compound.

The first yellow-dye polarizer and the second yellow-dye polarizer further include a polymerizable liquid crystal monomer, a photoinitiator, and a photo-stabilizer.

The first substrate includes a plurality of color resist blocks which are arranged in an array. The color resist blocks include a red resist block and a green resist block. The blue backlight source irradiates through the red resist block to form a red light. The blue backlight source irradiates through the green resist block to form a green light.

The first substrate includes a plurality of quantum-dot units which are arranged in an array. The quantum-dot units include a red quantum-dot unit and a green quantum-dot unit. The blue backlight source irradiates through the red quantum-dot unit to form a red light. The blue backlight source irradiates through the green quantum-dot unit to form a green light.

The blue backlight module is located on the surface of the first substrate where is far from the second substrate.

A method for manufacturing a yellow-dye polarizer is provided. The method includes the following steps of:

evenly stirring a yellow-dye mixed solution under a condition of a constant temperature water bath;

dripping the yellow-dye mixed solution onto an alignment film, and then spin-coating the yellow-dye mixed solution to form a wet film;

baking the wet film; and curing the wet film by an ultraviolet irradiation after full volatilization of a solvent in the wet film to obtain the yellow-dye polarizer.

The yellow-dye mixed solution includes:

3 to 15 percent by weight of a dichroism yellow-dye compound;

20 to 30 percent by weight of a polymerizable liquid crystal monomer;

1 to 3 percent by weight of a photoinitiator;

70 to 75 percent by weight of a solvent; and 1 to 5 percent by weight of a photo-stabilizer.

The method further includes: using a polarized light source to achieve an alignment.

The present disclosure has the following beneficial effects. The absorption wavelength of the yellow-dye polarizer (i.e., the first yellow-dye polarizer and the second yellow-dye polarizer) can be exactly consistent with the region of the light-emitting wavelength of the blue backlight module. Thus, the utilization efficiency of the blue backlight source is maximized, and the degree of polarization thereof is drastically increased. While retaining the advantages of low cost and low power consumption of the liquid crystal display of the blue backlight module, there are advantages of the simple manufacturing process of the dye polarizer and excellent hygrothermal properties.

BRIEF DESCRIPTION OF THE DRAWINGS

In order to illustrate the technical solutions of the present disclosure in a clearer manner, the drawings desired for the embodiments will be described briefly hereinafter. Obviously, the following drawings merely relate to some embodiments of the present disclosure, and based on these drawings, a person skilled in the art may obtain the other drawings without any creative effort.

DETAILED DESCRIPTION OF THE PREFERRED EMBODIMENTS

In the following, it is clearly and completely described the technical solutions according to the embodiments of the present disclosure. It is obvious that the described embodiments are some of the embodiments of the present disclosure rather than all of the embodiments. All of other embodiments that those skilled in the art may implement based on the embodiments of the present disclosure without creative work should also fall within the scope of the present disclosure.

Figure 1:
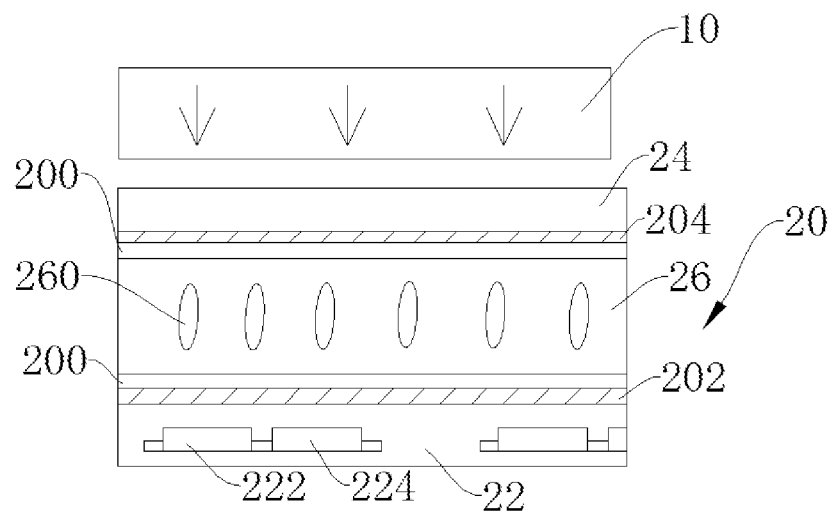
FIG. 1 is a schematic view of a structure of a liquid crystal panel according to the first embodiment of the present disclosure.
Figure 4:
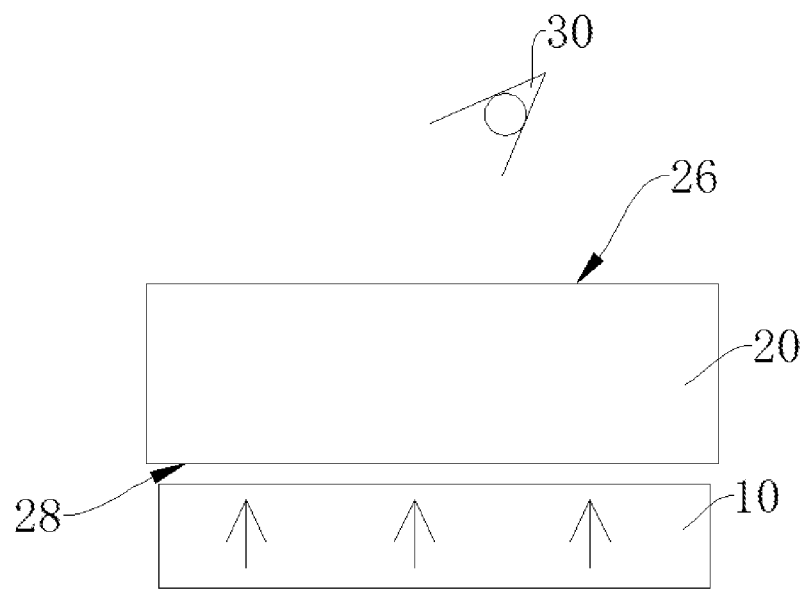
FIG. 4 is a schematic view of a structure of a liquid crystal display according to one embodiment of the present disclosure.

Please refer to FIGS. 1 and 4, a liquid crystal panel 20 provided by the first embodiment of the present disclosure is oppositely stacked with a blue backlight module 10. The blue backlight module 10 emits a blue backlight source which irradiates through the liquid crystal panel 20 so that the liquid crystal panel 20 displays a color image information to be received by eyes 30 of a user.

The liquid crystal panel 20 includes a first yellow-dye polarizer 202, a second yellow-dye polarizer 204, a first substrate 22, a liquid crystal layer 26, and a second substrate 24. The first substrate 22, the liquid crystal layer 26, and the second substrate 24 are stacked-up in sequence. Specifically, the first substrate 22 and the second substrate 24 are correspondingly arranged and opposite each other. The liquid crystal layer 26 is sandwiched between the first substrate 22 and the second substrate 24. In one embodiment, the first substrate 22 is a color filter substrate, and the second substrate 24 is an array substrate. The first substrate 22, the liquid crystal layer 26, and the second substrate 24 forms a closed liquid crystal cell by the adhesion of a sealant. By the rotating status of liquid crystal molecules 260, which plays a switching role, in the liquid crystal layer 26, a backlight source can be controlled as to whether or not it irradiates through the liquid crystal cell.

Further, the first yellow-dye polarizer 202 is sandwiched between the liquid crystal layer 26 and the first substrate 22. The second yellow-dye polarizer 204 is sandwiched between the second substrate 24 and the liquid crystal layer 26. The polarization direction of the first yellow-dye polarizer 202 is perpendicular to the polarization direction of the second yellow-dye polarizer 204. Specifically, the first yellow-dye polarizer 202 is fitted on the surface of the first substrate 22 where faces to the liquid crystal layer 26. The second yellow-dye polarizer 204 is fitted on the surface of the second substrate 24 where faces to the liquid crystal panel 20. The first yellow-dye polarizer 202 and the second yellow-dye polarizer 204 are located inside the liquid crystal cell, thereby avoiding the effect of an external environment (e.g., a hygrothermal environment and the like) on the first yellow-dye polarizer 202 and the second yellow-dye polarizer 204, increasing the working life of the first yellow-dye polarizer 202 and the second yellow-dye polarizer 204, reducing maintenance costs, and improving the display effect of the liquid crystal panel 20.

Only the blue backlight source which has the same polarization direction as the first yellow-dye polarizer 202 is passed through the first yellow-dye polarizer 202 to irradiate on the liquid crystal layer 26. Only the blue backlight source which has the same polarization direction as the second yellow-dye polarizer 204 is passed through the second yellow-dye polarizer 204 to irradiate outside the liquid crystal panel 20 to be received by the eyes 30. The blue backlight source provided by the blue backlight module 10 shines into the first yellow-dye polarizer 202, and then shines into the liquid crystal layer 26, and the polarization direction of the blue backlight source is changed by controlling the deflection state of the liquid crystal molecules 260 in the liquid crystal layer 26, thereby controlling an image content received by the eyes 30 of passing through the second yellow-dye polarizer 204 to irradiate outside the liquid crystal panel 20.

The absorption wavelength of the yellow-dye polarizer (i.e., the first yellow-dye polarizer 202 and the second yellow-dye polarizer 204) can be exactly consistent with the region of the light-emitting wavelength of the blue backlight module 10. Thus, the utilization efficiency of the blue backlight source is maximized, and the degree of polarization thereof is drastically increased. While retaining the advantages of low cost and low power consumption of the liquid crystal display of the blue backlight module 10, there are advantages of the simple manufacturing process of the dye polarizer and excellent hygrothermal properties.

In the embodiment, the liquid crystal panel 20 further includes an alignment layer 200. The alignment layer 200 is sandwiched between the liquid crystal layer 26 and the first yellow-dye polarizer 202, and is sandwiched between the liquid crystal layer 26 and the second yellow-dye polarizer 204. The alignment layer 200 is used for aligning the liquid crystal molecules 260 of the liquid crystal layer 26, so that the liquid crystal molecules 260 has a regular initial deflection state, thus is convenient for Subsequently controlling the liquid crystal layer 26.

In the embodiment, the first yellow-dye polarizer 202 and the second yellow-dye polarizer 204 include a dichroism yellow-dye compound. The dichroism yellow-dye compound includes one or more of an azo compound, an anthraquinone compound, and a naphthalimide compound. Further, the weight ratio of the dichroism yellow-dye compound is 3% to 15%. The main feature of the dichroism yellow-dye compound is that the distribution of the absorption wavelength thereof is between 400 nm and 480 nm, but pure yellow is not restricted by the present disclosure, for example, it can be nearly yellow color, such as orange yellow, deep yellow, sand yellow, and the like. Experimental studies have proved that a single type of dichroism yellow-dye compound is more beneficial to dispersion, and the degree of polarization of a polarizer formed by the single type of dichroism yellow-dye compound is the highest and can reach over 99%.

Further, the first yellow-dye polarizer 202 and the second yellow-dye polarizer 204 further include a polymerizable liquid crystal monomer, a photoinitiator, and a photo-stabilizer. Specifically, the polymerizable liquid crystal monomer is a polymerizable chain small-molecule monomer having —C=C—, —C=C—C—, or the like. The weight ratio of the polymerizable liquid crystal monomer is 20% to 30%. The photoinitiator can match with the polymerizable liquid crystal monomer. The weight ratio of the photoinitiator is 1% to 3%. The photo-stabilizer can be phenyl methyl ketone, benzotriazole, octyloxy phenol, phosphite, or the like. The weight ratio of the photo-stabilizer is 1% to 5%. In the preparation process of the yellow-dye mixed solution, a yellow dichroism dye compound is more easily dispersed and is almost unaggregated, thus is advantageous to improving the polarization property of the polarizer.

In one embodiment, the first yellow-dye polarizer 202 and the second yellow-dye polarizer 204 are formed by coating a yellow-dye mixed solution. The yellow-dye mixed solution further includes a solvent. The solvent can be acetone, toluene, propylene glycol, dichloromethane, DMF, NMP, PGMEA, or the like. The weight ratio of the solvent is 70% to 75%. The manufacturing process of a yellow-dye polarizer employs the coating method of a yellow dichroism dye. In comparison with a traditional method for extending a polarizer, that has the advantages in simple coating process and lightweight (without a TAC layer), and the dye has excellent hygrothermal properties. Therefore, an iodine contained polarizer can be replaced in new technology aspects of quantum dot technology, OLED technology, and the like, thus there are extensive prospects of application. Dye type organic matters have excellent hygrothermal properties and a simple manufacturing process, and that can be ensured that the performance of the polarizer is not affected by the high temperature processing of subsequent processes, thus is advantageous to mass production.

In the embodiment, the first substrate 22 includes a plurality of color resist blocks which are arranged in an array. The color resist blocks include a red resist block 222 and a green resist block 224. The blue backlight source irradiates through the red resist block 222 to form a red light. The blue backlight source irradiates through the green resist block 224 to form a green light. Further, the color resist blocks are formed by illuminating photoresist materials. The blue backlight source non-irradiating through the red resist block or the green resist block remains a blue light. Three primary colors contain the blue light, the green light, and the red light, thereby constituting a color image. Also, the content of the display image of the liquid crystal panel 20 is controlled by controlling the deflection state of the liquid crystal molecules 260.

The absorption wavelength of the yellow-dye polarizer (i.e., the first yellow-dye polarizer 202 and the second yellow-dye polarizer 204) can be exactly consistent with the region of the light-emitting wavelength of the blue backlight module 10. Thus, the utilization efficiency of the blue backlight source is maximized, and the degree of polarization thereof is drastically increased. While retaining the advantages of low cost and low power consumption of the liquid crystal display of the blue backlight module 10, there are advantages of the simple manufacturing process of the dye polarizer and excellent hygrothermal properties.

Figure 2:
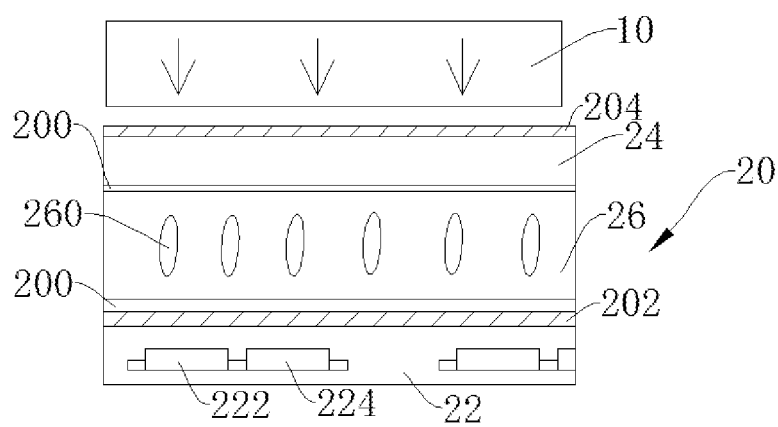
FIG. 2 is a schematic view of a structure of a liquid crystal panel according to the second embodiment of the present disclosure.

Please refer to FIG. 2, the liquid crystal panel 20 provided by the second embodiment of the present disclosure and the first embodiment are different in that: the second yellow-dye polarizer 204 is disposed on the surface of the second substrate 24 where is far from the liquid crystal layer 26. That is, the second yellow-dye polarizer 204 is located outside the liquid crystal cell. Specifically, the second yellow-dye polarizer 204 is fitted on the second substrate 24 where is far from the liquid crystal layer 26. The second yellow-dye polarizer 204 located outside the liquid crystal cell still remains good characteristics in a hygrothermal environment since the dye type organic matters have the excellent hygrothermal properties, thereby improving the display effect of the liquid crystal panel, having a longer working life, improving the user experience, and reducing maintenance costs.

Figure 3:
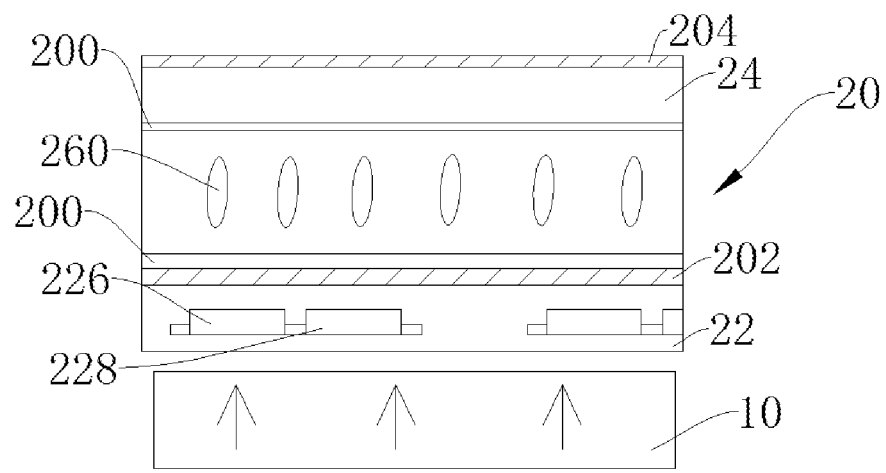
FIG. 3 is a schematic view of a structure of a liquid crystal panel according to the third embodiment of the present disclosure.

Please refer to FIG. 3, the liquid crystal panel 20 provided by the third embodiment of the present disclosure and the first embodiment are different in that: the first substrate 22 includes a plurality of quantum-dot units which are arranged in an array. The quantum-dot units include a red quantum-dot unit 226 and a green quantum-dot unit 228. The blue backlight source irradiates through the red quantum-dot unit 226 to form a red light. The blue backlight source irradiates through the green quantum-dot unit 228 to form a green light. Quantum dot liquid crystal displays can efficiently enhance the color gamut value of a display screen, so that the color thereof is more pure and bright, and the color expression thereof has more tension. Further, the blue backlight module 10 is located on the surface of the first substrate 22 where is far from the second substrate 24. The light (i.e., the red light and the green light) will be disordered when quantum dot materials are matched with a blue back light, and the blue backlight source excites the red quantum-dot unit 226 and the green quantum-dot unit 228. At this point, the first yellow-dye polarizer 202 can correct the light, so that the light irradiates through the liquid crystal layer 26 in the form of a linear polarization light, and the liquid crystal display can be normally displayed. This has an important significance in the applications of the quantum dot materials used in a blue backlight liquid crystal display. In addition, dye type organic matters have excellent hygrothermal properties and a simple manufacturing process, and that can be ensured that the performance of the polarizer is not affected by the high temperature processing of subsequent processes, thus is advantageous to mass production.

Please refer to FIG. 4, the liquid crystal display includes the blue backlight module 10 and the liquid crystal panel 20 provided by the embodiment of the present disclosure. The blue backlight module 10 is oppositely stacked with the liquid crystal panel 20. The blue backlight module 10 provides a blue backlight source irradiating through the displaying image information of the liquid crystal panel 20 to be received by eyes 30 of a user. Specifically, the liquid crystal panel 20 includes a display surface 26 and a non-display surface 28. The blue backlight module 10 is located on the side of the non-display surface 28 of the liquid crystal panel 20. Further, the liquid crystal display further includes a driving circuit. The driving circuit controls a common electrode and a pixel electrode in the liquid crystal panel 20, thereby controlling the deflection of the liquid crystal molecules 260, and changing the image display content thereof.

The absorption wavelength of the yellow-dye polarizer (i.e., the first yellow-dye polarizer 202 and the second yellow-dye polarizer 204) can be exactly consistent with the region of the light-emitting wavelength of the blue backlight module 10. Thus, the utilization efficiency of the blue backlight source is maximized, and the degree of polarization thereof is drastically increased. While retaining the advantages of low cost and low power consumption of the liquid crystal display of the blue backlight module 10, there are advantages of the simple manufacturing process of the dye polarizer and excellent hygrothermal properties.

Figure 5:
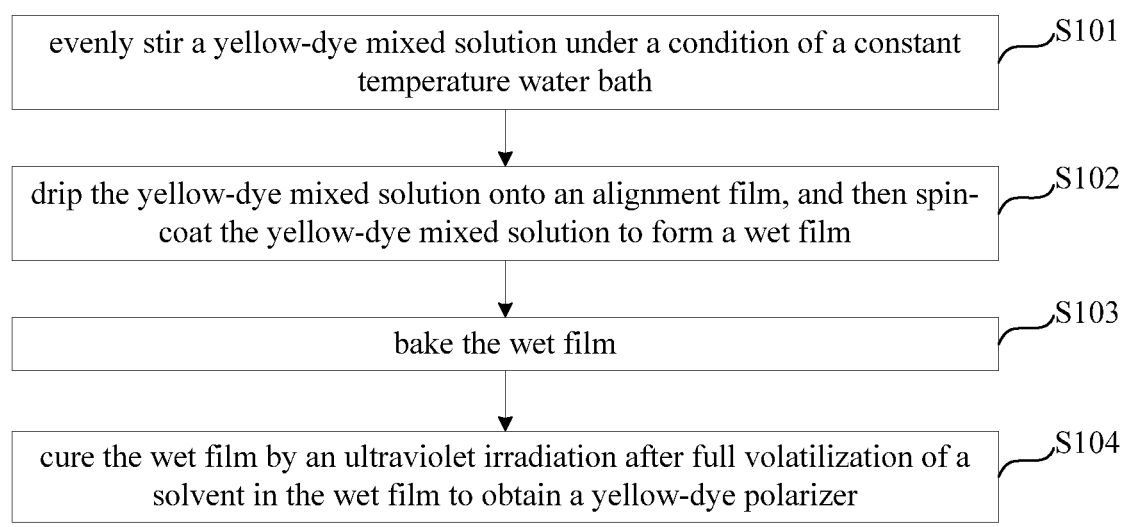
FIG. 5 is a flow chart of a method according to one embodiment of the present disclosure for manufacturing a yellow-dye polarizer.

Please refer to FIG. 5, which is a method for manufacturing a yellow-dye polarizer. The method includes the following steps S101-S104.

In the step S101, a yellow-dye mixed solution is evenly stirred under a condition of a constant temperature water bath.

In the embodiment, the yellow-dye mixed solution includes:
3 to 15 percent by weight of a dichroism yellow-dye compound;
20 to 30 percent by weight of a polymerizable liquid crystal monomer;
1 to 3 percent by weight of a photoinitiator;
70 to 75 percent by weight of a solvent; and
1 to 5 percent by weight of a photo-stabilizer.

Specifically, the dichroism yellow-dye compound includes one or more of an azo compound, an anthraquinone compound, and a naphthalimide compound. Further, the weight ratio of the dichroism yellow-dye compound is 3% to 15%. The main feature of the dichroism yellow-dye compound is that the distribution of the absorption wavelength thereof is between 400 nm and 480 nm, but pure yellow is not restricted by the present disclosure, for example, it can be nearly yellow color, such as orange yellow, deep yellow, sand yellow, and the like. Experimental studies have proved that a single type of dichroism yellow-dye compound is more beneficial to dispersion, and the degree of polarization of a polarizer formed by the single type of dichroism yellow-dye compound is the highest and can reach over 99%.

The polymerizable liquid crystal monomer is a polymerizable chain small-molecule monomer having —C=C—, —C=C—C—, or the like. The weight ratio of the polymerizable liquid crystal monomer is 20% to 30%. The photoinitiator can match with the polymerizable liquid crystal monomer. The weight ratio of the photoinitiator is 1% to 3%. The photo-stabilizer can be phenyl methyl ketone, benzotriazole, octyloxy phenol, phosphite, or the like. The weight ratio of the photo-stabilizer is 1% to 5%. The solvent can be acetone, toluene, propylene glycol, dichloromethane, DMF, NMP, PGMEA, or the like. The weight ratio of the solvent is 70% to 75%. In the preparation process of the yellow-dye mixed solution, a yellow dichroism dye compound is more easily dispersed and is almost unaggregated, thus is advantageous to improving the polarization property of the polarizer.

In the embodiment, the first substrate 22 includes a plurality of color resist blocks which are arranged in an array. The color resist blocks include a red resist block 222 and a green resist block 224. The blue backlight source irradiates through the red resist block 222 to form a red light. The blue backlight source irradiates through the green resist block 224 to form a green light. Further, the color resist blocks are formed by illuminating photoresist materials. The blue backlight source non-irradiating through the red resist block or the green resist block remains a blue light. Three primary colors contain the blue light, the green light, and the red light, thereby constituting a color image. Also, the content of the display image of the liquid crystal panel 20 is controlled by controlling the deflection state of the liquid crystal molecules 260.

In the embodiment, the yellow-dye mixed solution is stirred under a condition of a constant temperature water bath at 50-100° C. to obtain a best stirring effect (i.e., evenly stirring).

In the step S102, the yellow-dye mixed solution is dripped on an alignment film, and then is spin-coated to form a wet film.

In the embodiment, the rotating speed of a spin coater is set as 400 r/min to 2500 r/min, a first spin-coat time is 1-4 seconds, a second spin-coat time is 2-6 seconds, so as to achieve the best effect of spin-coating.

In the step S103, the wet film is baked.

In the embodiment, the baking temperature is controlled to be 40-70° C. to reduce the baking time under the precondition of the non-destruction of the yellow-dye polarizer, thereby enhancing manufacturing efficiency.

In the step S104, the wet film is cured by an ultraviolet irradiation after full volatilization of a solvent in the wet film to obtain the yellow-dye polarizer.

The ultraviolet wavelength thereof is between 200 nm and 400 nm, and the intensity thereof is between 100 mj and 1000 mj, so as to obtain a best curing effect.

In the embodiment, the yellow-dye polarizer obtained by curing must be aligned to obtain a specific polarization direction. In a preferred embodiment, an alignment is achieved by a polarized light source. In other embodiments, the alignment can also be achieved by employing a TN type PI film, an IPS type PI film, an UV2A type PI film, a hydrophilic/hydrophobic/lipophilic/lipophobic modifying interface, and the like.

The absorption wavelength of the yellow-dye polarizer can be exactly consistent with the region of the light-emitting wavelength of the blue backlight module 10. Thus, the utilization efficiency of the blue backlight source is maximized, and the degree of polarization thereof is drastically increased. While retaining the advantages of low cost and low power consumption of the liquid crystal display of the blue backlight source, there are advantages of the simple manufacturing process of the dye polarizer and excellent hygrothermal properties. A yellow dichroism dye pure substance is more beneficial to dispersion, thereby the agglomeration of the dye in the process for manufacturing the yellow-dye mixed solution is avoided, thus is advantageous to manufacturing a polarizer having a high degree of polarization and a high contrast.

The above are merely embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure. Thus, a scope of the present disclosure is confined in claims.

What is claimed is:

1. A liquid crystal panel, oppositely stacked with a blue backlight module, wherein the liquid crystal panel comprises a first yellow-dye polarizer, a second yellow-dye polarizer, a first substrate, a liquid crystal layer, and a second substrate, wherein the first substrate, the liquid crystal layer, and the second substrate are stacked-up in sequence; the first yellow-dye polarizer is sandwiched between the liquid crystal layer and the first substrate; the second yellow-dye polarizer is sandwiched between the second substrate and the liquid crystal layer, or is disposed on a surface of the second substrate that is far from the liquid crystal layer; a polarization direction of the first yellow-dye polarizer is perpendicular to a polarization direction of the second yellow-dye polarizer; and the blue backlight module provides a blue backlight source irradiating through a displaying image of the liquid crystal panel;

wherein the first substrate comprises a plurality of quantum-dot units that are arranged in an array, the quantum-dot units comprising a red quantum-dot unit and a green quantum-dot unit; and the blue backlight source is provided to face the first substrate and transmits blue light that irradiates the red quantum-dot unit and the green quantum-dot unit, such that the red quantum-dot unit and the green quantum-dot unit receive and convert a first portion of the blue light from the blue backlight source into red light and green light, respectively, while a second portion of the blue light from the blue backlight source is allowed to directly transmit through the first substrate and subsequently transmits through the first and second yellow-dye polarizers to project out of the second substrate as blue light;

wherein each of the first yellow-dye polarizer and the second yellow-dye polarizer comprises a dichroism yellow-dye compound, a polymerizable liquid crystal monomer, a photoinitiator, and a photo-stabilizer; and wherein each absorption wavelength range of the first yellow-dye polarizer and the second yellow-dye polarizer is exactly consistent with the region of the light-emitting wavelength of the blue backlight module.

2. The liquid crystal panel of claim 1, wherein the dichroism yellow-dye compound comprises one or more of an azo compound, an anthraquinone compound, and a naphthalimide compound.

3. A liquid crystal display, comprising a blue backlight module and a liquid crystal panel, wherein the liquid crystal panel comprises a first yellow-dye polarizer, a second yellow-dye polarizer, a first substrate, a liquid crystal layer, and a second substrate, wherein the first substrate, the liquid crystal layer, and the second substrate are stacked-up in sequence; the first yellow-dye polarizer is sandwiched between the liquid crystal layer and the first substrate; the second yellow-dye polarizer is sandwiched between the second substrate and the liquid crystal layer, or is disposed on a surface of the second substrate that is far from the liquid crystal layer; a polarization direction of the first yellow-dye polarizer is perpendicular to a polarization direction of the second yellow-dye polarizer, the blue backlight module provides a blue backlight source irradiating through a displaying image of the liquid crystal panel, and the blue backlight module is oppositely stacked with the liquid crystal panel;

wherein the first substrate comprises a plurality of quantum-dot units that are arranged in an array, the quantum-dot units comprising a red quantum-dot unit and a green quantum-dot unit; and the blue backlight source is provided to face the first substrate and transmits blue light that irradiates the red quantum-dot unit and the green quantum-dot unit, such that the red quantum-dot unit and the green quantum-dot unit receive and convert a first portion of the blue light from the blue backlight source into red light and green light, respectively, while a second portion of the blue light from the blue backlight source is allowed to directly transmit through the first substrate and subsequently transmits through the first and second yellow-dye polarizers to project out of the second substrate as blue light;

wherein each of the first yellow-dye polarizer and the second yellow-dye polarizer comprises a dichroism yellow-dye compound, a polymerizable liquid crystal monomer, a photoinitiator, and a photo-stabilizer; and wherein each absorption wavelength range of the first yellow-dye polarizer and the second yellow-dye polarizer is exactly consistent with the region of the light-emitting wavelength of the blue backlight module.

4. The liquid crystal panel of claim 3, wherein the dichroism yellow-dye compound comprises one or more of an azo compound, an anthraquinone compound, and a naphthalimide compound.

* * * * *